US007307987B2

(12) United States Patent
Tufford et al.

(10) Patent No.: US 7,307,987 B2
(45) Date of Patent: Dec. 11, 2007

(54) MULTI-NETWORK MODULES WITH HOT-SWAP CAPABILITY

(75) Inventors: Robert C. Tufford, Chandler, AZ (US); Jeffrey M. Harris, Chandler, AZ (US); Douglas L. Sandy, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 665 days.

(21) Appl. No.: 10/947,972

(22) Filed: Sep. 23, 2004

(65) Prior Publication Data

US 2006/0072545 A1    Apr. 6, 2006

(51) Int. Cl.
H04L 12/56    (2006.01)
(52) U.S. Cl. ...................... 370/386; 710/300
(58) Field of Classification Search ............... None
See application file for complete search history.

(56) References Cited

U.S. PATENT DOCUMENTS

| | | | | |
|---|---|---|---|---|
| 6,662,254 | B1* | 12/2003 | Tal et al. ............... | 710/300 |
| 7,154,747 | B2* | 12/2006 | Tufford et al. ........... | 370/254 |
| 7,174,470 | B2* | 2/2007 | Percer et al. ............ | 713/300 |
| 2006/0061959 | A1* | 3/2006 | Harris et al. ............ | 361/686 |
| 2006/0062212 | A1* | 3/2006 | Sandy et al. ............ | 370/386 |
| 2006/0062213 | A1* | 3/2006 | Harris et al. ............ | 370/386 |
| 2006/0062226 | A1* | 3/2006 | Harris et al. ............ | 370/401 |
| 2006/0062227 | A1* | 3/2006 | Tufford et al. ........... | 370/401 |
| 2006/0062245 | A1* | 3/2006 | Sandy et al. ............ | 370/465 |

* cited by examiner

Primary Examiner—Chi Pham
Assistant Examiner—Anh-Vu Ly

(57) ABSTRACT

A payload module (202) includes a payload subunit (212) coupled to the payload module, where the payload module has one of a 3U form factor, a 6U form factor and a 9U form factor. At least one multi-gigabit connector (218) is coupled to a rear edge (219) of the payload module and to the payload subunit, where the at least one multi-gigabit connector is coupled to communicatively interface the payload subunit to a backplane (204), where the backplane includes a switched fabric (206) coincident with at least one of a VMEbus network and a PCI network, and where the switched fabric and at least one of the VMEbus network and the PCI network are communicatively coupled with the payload subunit through the at least one multi-gigabit connector. A payload module power connector (242) includes a plurality of pins (243), where at least one of the plurality of pins has a length different from a remaining portion of the plurality of pins such that power between a main power bus (207) on the backplane and a payload module power bus (240) on the payload module is at least one of applied and removed, in a smooth and gradually ramped fashion over a time period (302, 304), where power and any concurrent data operations on the backplane remain uninterrupted and unaffected during the at least one of applying and removing power between the main power bus and the payload module power bus.

16 Claims, 2 Drawing Sheets

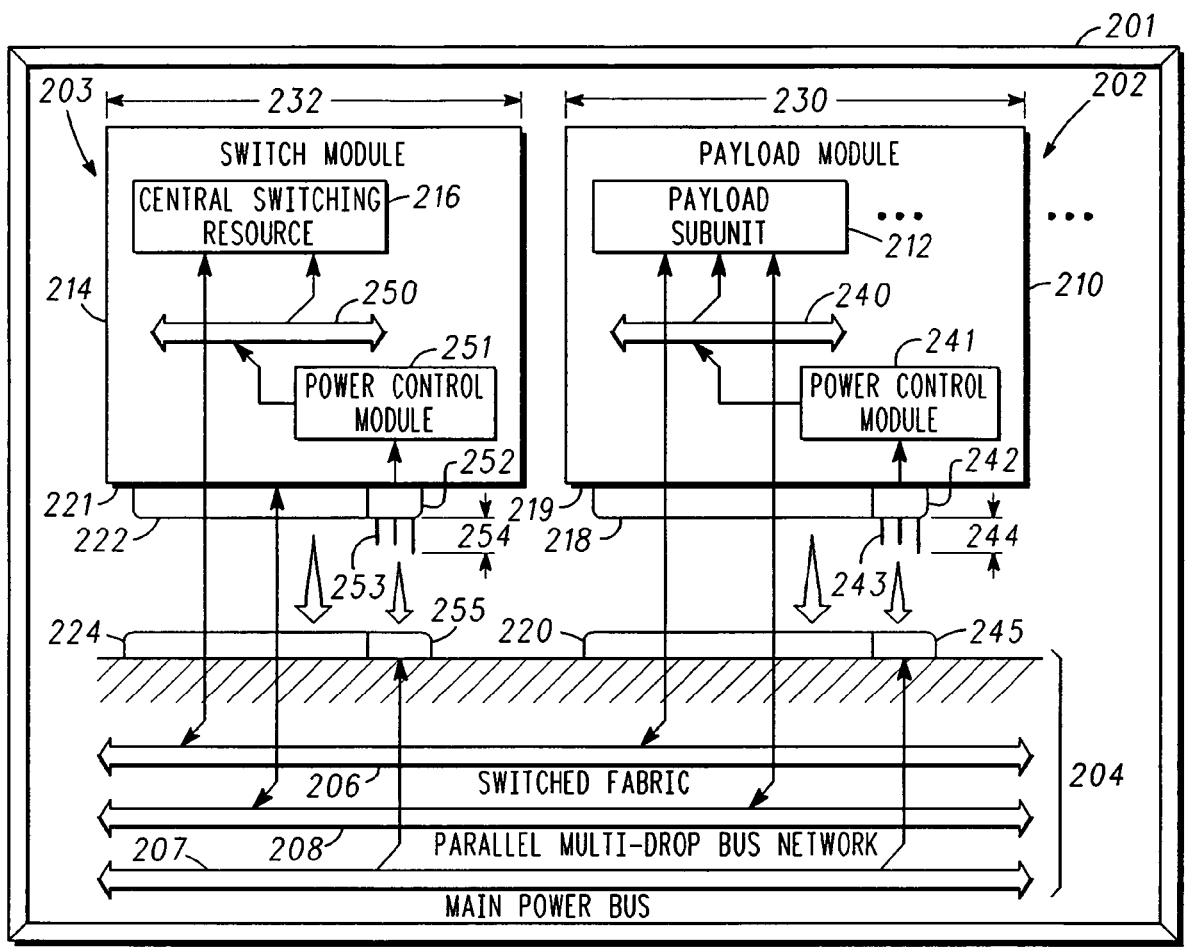
FIG. 2
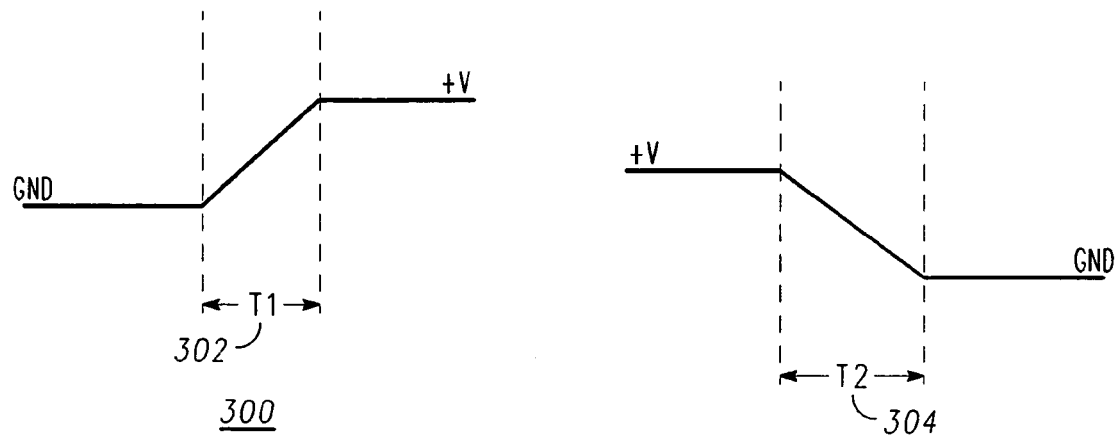
FIG. 3
FIG. 4

MULTI-NETWORK MODULES WITH HOT-SWAP CAPABILITY

RELATED APPLICATIONS

Related subject matter is disclosed in U.S. patent application entitled "PAYLOAD MODULE COUPLED TO MULTIPLE NETWORKS THROUGH MULTI-GIGABIT CONNECTOR" having application Ser. No. 10/947,897 and filed on the same date herewith and assigned to the same assignee.

Related subject matter is disclosed in U.S. patent application entitled "SWITCH MODULE HAVING ONE OF 3U AND 9U FORM FACTOR" having application Ser. No. 10/947,971 and filed on the same date herewith and assigned to the same assignee.

BACKGROUND OF THE INVENTION

Payload modules and switch modules can be added to computer systems to augment or expand functionality. Current expansion cards interface and communicate with computer systems using primarily a multi-drop parallel bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. However, some applications have requirements for simultaneous high bandwidth transfers between modules that cannot be handled by the multi-drop parallel bus architecture.

In the prior art, 6U form factor cards are common. The 3U form factor offers an advantage for applications where physical space is at a premium. The 9U form factor offers an advantage of placing more computing features on a given card. Prior art 3U and 9U form factor expansion cards interface with a backplane using multi-drop parallel networks. This has the disadvantage of being slow and cumbersome for network expansion.

Accordingly, there is a significant need for an apparatus and method that overcomes the deficiencies of the prior art outlined above.

BRIEF DESCRIPTION OF THE DRAWINGS

Referring to the drawing:

FIG. 2 depicts a multi-service platform system according to another embodiment of the invention;

FIG. 3 illustrates the ramping up of power to a module according to an embodiment of the invention; and FIG. 4 illustrates the ramping down of power to a module according to an embodiment of the invention.

Figure 1:
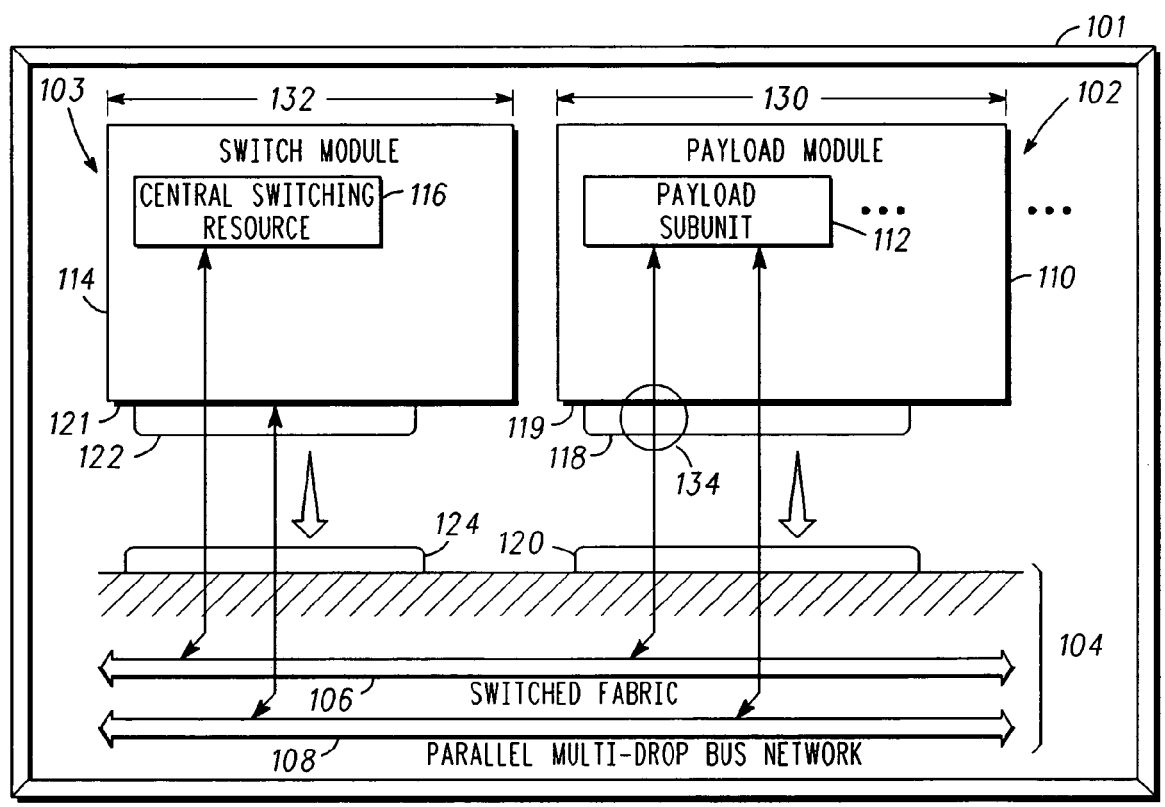
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. Multi-service platform system 100 can include computer chassis 101, with software and any number of slots for inserting modules, which can be, for example and without limitation, a payload module 102, a switch module 103, and the like. Payload module 102 can add functionality to multi-service platform system 100 through the addition of processors, memory, storage devices, device interfaces, network interfaces, and the like. In an embodiment, multi-service platform system 100 can be an embedded, distributed processing computer system, where computer chassis 101 is an embedded computer chassis.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

Multi-service platform system 100 can include backplane 104 coupled for receiving payload module 102 and switch module 103. Backplane 104 can include hardware and software necessary to implement a coincident parallel multi-drop bus network 108 and a switched fabric 106. Backplane 104 can include switched fabric 106 and a parallel multi-drop bus network 108. In an embodiment, both switched fabric 106 and parallel multi-drop bus network 108 run concurrently on backplane 104.

In an embodiment, parallel multi-drop bus network 108 can be a VMEbus network. VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network can include VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network 108 is not limited to the use of these VMEbus based protocols and other VMEbus based protocols are within the scope of the invention.

In another embodiment, parallel multi-drop bus network 108 can be a Peripheral Component Interconnect (PCI) network. PCI network can include standard PCI or Peripheral Component Interconnect-X (PCI-X) based protocols. Examples of variants of PCI-X protocols, without limitation, include 133 MHz 64-bit PCI-X, 100 MHz 64-bit PCI-X down to 66 MHz 32-bit PCI-X, and the like. Examples of PCI based protocols (a subset of PCI-X based protocols), can include 66 MHz 64-bit PCI down to 33 MHz 32-bit PCI, and the like.

Switched fabric 106 can use switch module 103, particularly central switching resource 116 on switch module 103, as a hub. Switch module 103 can be coupled to any number of payload modules 102. Switched fabric 106 can be based on a point-to-point, switched input/output (I/O) fabric, whereby cascaded switch devices interconnect end node devices. Although FIG. 1 depicts switched fabric 106 as a bus for diagrammatic ease, switched fabric 106 may in fact be a star topology, mesh topology, and the like as known in the art for communicatively coupling modules. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network standards, for example and without limitation, InfiniBand™, Serial RapidIO™, FibreChannel™, Ethernet™, PCI Express™, Hypertransport™, and the like. Switched fabric 106 is not limited to the use of these switched fabric network standards and the use of any switched fabric network standard is within the scope of the invention.

In an embodiment of the invention, parallel multi-drop bus network 108 and switched fabric 106 operate concurrently within multi-service platform system 100. In an example of an embodiment, parallel multi-drop bus network 108 can operate as a control plane by synchronizing and organizing activities in multi-service platform system 100. Switched fabric 106 can operate as a data plane by transferring data between individual payload modules 102. In this embodiment, data is transferred faster through the higher bandwidth switched fabric 106, while the parallel multi-drop bus network 108 controls and manages the overall system. This has the effect of increasing the speed of multi-service platform system 100 since data transfers that are in excess of parallel multi-drop bus network 108 bandwidth can take place using switched fabric 106. In an embodiment, payload module 102 is communicatively coupled with backplane 104 using switched fabric 106 and at least one of VMEbus network or PCI network (parallel multi-drop bus network 108).

Multi-service platform system 100 can include any number of payload modules 102 and switch modules 103 coupled to backplane 104. Backplane 104 can include hardware and software necessary to implement a coincident parallel multi-drop bus network 108 and a switched fabric 106.

In an embodiment, payload module 102 can comprise a board 110, for example a printed wire board (PWB), and the like. Coupled to the board 110 can be one or more payload subunits 112. In an embodiment, payload subunit 112 can include any combination of processor, memory, storage, communication devices and the like. Payload subunit 112 can add any type of computing, storage, communication features, and the like, to multi-service platform system 100. In an embodiment, payload module 102 can have a form factor 130, which can refer to physical dimensions, electrical connections, and the like, of payload module 102. In an embodiment, payload module 102 can have one of a 3U form factor, 6U form factor or a 9U form factor.

As is known in the art, "U" and multiples of "U" can refer to the width of a module or expansion card. In an embodiment, "U" can measure approximately 1.75 inches. Payload module 102 can have its own specific set of electrical connections to interface with backplane 104 of computer chassis 101. As an example of an embodiment, multi-service platform system 100 can include computer chassis 101 and one or more payload modules 102, each having one of a 3U form factor, 6U form factor or a 9U form factor. In an embodiment, such payload modules 102 can conform to the VITA 46 standard as set forth by VMEbus International Trade Association (VITA), P.O. Box 19658, Fountain Hills, Ariz., 85269.

In an embodiment, switch module 103 can comprise a board 114, for example a printed wire board (PWB), and the like. Coupled to the board 114 can be one or more central switching resources 116 that can for example, function as a hub for switched fabric 106. In an embodiment, switch module 103 can include any combination of processor, memory, storage, communication devices and the like. Switch module 103 can add any type of computing, storage, communication features, and the like to multi-service platform system 100. In an embodiment, switch module 103 can have a form factor 132, which can refer to physical dimensions, electrical connections, and the like, of switch module 103. In an embodiment, switch module 103 can have one of a 3U form factor, 6U form factor or a 9U form factor.

In an embodiment of the invention, backplane 104 and payload module 102 can have a set of interlocking, modular connectors designed to interlock with each other when payload module 102 is placed in a slot of multi-service platform system 100. In the embodiment shown, payload module 102 has at least one multi-gigabit connector 118 coupled to rear edge 119. In an embodiment, at least one multi-gigabit connector 118 can include printed circuit board (PCB) wafers (as opposed to metal pins), where wafers are held together in a plastic housing and can be coupled to the payload module 102 using press to fit contacts. For example, at least one multi-gigabit connector 118 can use PCB based pinless interconnect that uses printed circuit wafers instead of traditional pin and socket contacts.

In an embodiment, at least one multi-gigabit connector 118 can use at least one of single ended or differential pair 134 signal configuration in the same connector. Multi-gigabit connector 118 can transfer data in excess of three (3) gigabits per second per each differential pair 134. For example, differential pair 134 can couple payload subunit 112 to switched fabric 106 and transfer data to or from payload subunit 112 at a rate in excess of three gigabits per second. In an embodiment, differential pair 134 can be a bonded differential pair. At least one multi-gigabit connector 118 is coupled to communicatively interface payload module 102 with backplane 104, where switched fabric 106 and at least one of VMEbus network or PCI network (parallel multi-drop bus network 108) are communicatively coupled to payload module 102 through at least one multi-gigabit connector 118.

In an embodiment, at least one multi-gigabit connector 118 is coupled to interface with at least one corresponding multi-gigabit connector 120 on backplane 104. At least one corresponding multi-gigabit connector 120 can be a female receptacle with metal beam spring leaf contacts which engage with the PCB wafers of multi-gigabit connector 118 when coupled together.

In an embodiment, at least one multi-gigabit connector 118 spans substantially the entire portion of the rear edge 119 of payload module 102. Rear edge 119 can include any number of multi-gigabit connectors 118 and be within the scope of the invention. In an embodiment, all communication between payload module 102 and backplane 104 occur exclusively through at least one multi-gigabit connector 118. In this embodiment, rear edge 119 of payload module 102 excludes a legacy connector, which can include traditional pin and socket connectors designed for low-speed data transfer. In other words, all data transfer and communication, whether to/from switched fabric 106 and at least one of VMEbus network or PCI network (parallel multi-drop bus network 108) occur through at least one multi-gigabit connector 118.

In an example of an embodiment of the invention, at least one multi-gigabit connector 118 and corresponding at least one multi-gigabit connector 120 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

In an embodiment, multi-service platform system 100 can include switch module 103 as described above. In an embodiment, backplane 104 and switch module 103 can have a set of interlocking, modular connectors designed to interlock with each other when switch module 103 is placed in a slot of multi-service platform system 100. In the embodiment shown, switch module 103 has at least one multi-gigabit connector 122 coupled to rear edge 121. In an embodiment, at least one multi-gigabit connector 122 can include printed circuit board (PCB) wafers (as opposed to metal pins), where wafers are held together in a plastic housing and couple to the switch module 103 using press to fit contacts. For example, at least one multi-gigabit connector 122 can use PCB based pinless interconnect that uses printed circuit wafers instead of traditional pin and socket contacts.

In an embodiment, at least one multi-gigabit connector 122 can use at least one of single ended or differential pair (not shown on switch module for clarity) signal configuration in the same connector. Multi-gigabit connector 122 can transfer data in excess of three gigabits per second per each differential pair. For example, differential pair can couple central switching resource 116 to switched fabric 106 and transfer data at a rate in excess of three gigabits per second. In an embodiment, differential pair can be a bonded differential pair. In one embodiment, at least one multi-gigabit connector 122 is coupled to communicatively interface switch module 103 with backplane 104, particularly switched fabric 106. In another embodiment, at least one multi-gigabit connector 122 is coupled to communicatively interface switch module 103 with backplane 104, where switched fabric 106 and at least one of VMEbus network or PCI network (parallel multi-drop bus network 108) are communicatively coupled to switch module 103 through at least one multi-gigabit connector 122.

In an embodiment, at least one multi-gigabit connector 122 is coupled to interface with at least one corresponding multi-gigabit connector 124 on backplane 104. At least one corresponding multi-gigabit connector 124 can be a female receptacle with metal beam spring leaf contacts which engage with the PCB wafers of multi-gigabit connector 122 when coupled together.

In an embodiment, at least one multi-gigabit connector 122 spans substantially the entire portion of the rear edge 121 of switch module 103. Rear edge 121 can include any number of multi-gigabit connectors 122 and be within the scope of the invention. In an embodiment, all communication between switch module 103 and backplane 104 occur exclusively through at least one multi-gigabit connector 122. In this embodiment, rear edge 121 of switch module 103 excludes a legacy connector, which can include traditional pin and socket connectors designed for low-speed data transfer. In other words, all data transfer and communication, whether to/from switched fabric 106 or at least one of VMEbus network or PCI network (parallel multi-drop bus network 108) occur through at least one multi-gigabit connector 122.

In an example of an embodiment of the invention, at least one multi-gigabit connector 122 and corresponding at least one multi-gigabit connector 124 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

FIG. 2 depicts a multi-service platform system 200 according to another embodiment of the invention. In the embodiment depicted in FIG. 2, like numbered elements represent elements discussed with reference to FIG. 1. For example, payload module 202 depicted in FIG. 2 is analogous to payload module 102 depicted in FIG. 1.

In an embodiment, computer chassis 201 includes main power bus 207, which can supply power to payload module 202 and switch module 203. Payload module 202 can include payload module power bus 240 that is adapted to be electrically coupled to main power bus 207. Payload module power bus 240 is coupled to supply power to computing elements, such as payload subunit 212 on payload module 202.

Payload module 202 can include payload module power connector 242 that is coextensive with at least one multi-gigabit connector 218 on rear edge 219 of payload module 202. Payload module power connector 242 can be standard pin and socket type connector that is adapted to be coupled with corresponding payload module power connector 245 on backplane 204 when payload module 202 is inserted in a slot of computer chassis 201.

Payload module power connector 242 can include plurality of pins 243. In an embodiment, at least one of plurality of pins 243 can have a length 244 different from a remaining portion of the plurality of pins 243 such that when payload module 202 is inserted into a slot in computer chassis 201, at least one of the plurality of pins 243 engages corresponding payload module power connector 245 before the remaining portion of plurality of pins. In this way, power from main power bus 207 is applied to at least one of the plurality of pins before the remaining portion of the plurality of pins 243. Therefore, any circuits on payload module 202 coupled to at least one of the plurality of pins 243 can be powered up before other circuits coupled to the remaining portion of the plurality of pins. Using this feature, systems on payload module 202 can be powered up in a sequential fashion as payload module 202 is inserted into a slot and coupled to main power bus 207. The pin configuration of payload module power connector 242 allows power between main power bus 207 and payload module power bus 240 to be applied in a sequential manner as desired for a specific application. The pin configuration also allows payload module 202 to be hot-swapped in computer chassis 201, while power and data transfer on backplane 204 remains uninterrupted and unaffected. In another embodiment, any number of plurality of pins 243 can have any number of varying lengths 244 so as to stage power between main power bus 207 and payload module power bus 240 as necessary for a given application.

In an embodiment, payload module 202 can include power control module 241 coupled to payload module power bus 240. Power control module 241 can include any combination of hardware and software such that power between main power bus 207 and payload module power bus 240 is applied and removed in a smooth and gradually ramped fashion over a period of time. In an embodiment, this ramping of power can occur where power on main power bus 207 and any concurrent data operations on backplane 204 remain uninterrupted and unaffected during applying or removing power between main power bus 207 and payload module power bus 240.

In an embodiment, switch module 203 can include switch module power bus 250 that is adapted to be electrically coupled to main power bus 207. Switch module power bus 250 is coupled to supply power to computing elements, such as central switching resource 216 on switch module 203.

Switch module 203 can include switch module power connector 252 that is coextensive with at least one multi-gigabit connector 222 on rear edge 221 of switch module 203. Switch module power connector 252 can be a standard pin and socket type connector that is adapted to be coupled with corresponding switch module power connector 255 on backplane 204 when switch module 203 is inserted in a slot of computer chassis 201.

Switch module power connector 252 can include plurality of pins 253. In an embodiment, at least one of plurality of pins 253 can have a length 254 different from a remaining portion of the plurality of pins 253 such that when switch module 203 is inserted into a slot in computer chassis 201, the at least one of the plurality of pins 253 engages corresponding switch module power connector 255 before the remaining portion of plurality of pins. In this way, power from main power bus 207 is applied to at least one of the plurality of pins before the remaining portion of the plurality of pins 253. Therefore, any circuits on switch module 203 coupled to at least one of the plurality of pins 253 can be powered up before other circuits coupled to the remaining portion of the plurality of pins. Using this feature, systems on switch module 203 can be powered up in a sequential fashion as switch module 203 is inserted into a slot and coupled to main power bus 207. The pin configuration of switch module power connector 252 allows power between main power bus 207 and switch module power bus 250 to be applied in a sequential manner as desired for a specific application. The pin configuration also allows switch module 203 to be hot-swapped in computer chassis 201, while power and data transfer on backplane 204 remains uninterrupted and unaffected. In another embodiment, any number of plurality of pins 253 can have any number of varying lengths 254 so as to stage power between main power bus 207 and switch module power bus 250 as necessary for a given application.

In an embodiment, switch module 203 can include power control module 251 coupled to switch module power bus 250. Power control module 251 can include any combination of hardware and software such that power between main power bus 207 and switch module power bus 250 is applied and removed in a smooth and gradually ramped fashion over a period of time. In an embodiment, this ramping of power can occur where power on main power bus 207 and any concurrent data operations on backplane 204 remain uninterrupted and unaffected during applying or removing power between main power bus 207 and switch module power bus 250.

FIG. 3 illustrates the ramping up of power to a module according to an embodiment of the invention. As shown in FIG. 3, voltage can be applied to a payload module or switch module in a smooth and gradually ramped fashion from ground to a desired voltage over a period of time (T1) 302. Both the voltage and the period of time 302 can be selected by one skilled in the art to suit a particular application. The voltage depicted in FIG. 3 is not limiting of the invention. Current can also be ramped up in a similar manner and be within the scope of the invention.

FIG. 4 illustrates the ramping down of power to a module according to an embodiment of the invention. As shown in FIG. 4, voltage can be removed from a payload module or a switch module in a smooth and gradually ramped fashion from a voltage level to ground over a period of time (T2) 304. Both the voltage and the period of time 304 can be selected by one skilled in the art to suit a particular application. The voltage depicted in FIG. 4 is not limiting of the invention. Current can also be ramped down in a similar manner and be within the scope of the invention. In an embodiment, period of time 302 can be substantially the same as period of time 304. In another embodiment, period of time 302 can be different from period of time 304.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
    a backplane having a main power bus, wherein the backplane is coupled to operate a switched fabric coincident with at least one of a VMEbus network and a PCI network;
    a payload module having one of a 3U form factor, a 6U form factor and a 9U form factor, wherein the payload module is communicatively coupled with the backplane using the switched fabric and at least one of the VMEbus network and the PCI network, wherein the payload module includes a payload module power bus that is adapted to be electrically coupled to the main power bus;
    at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector; and a payload module power connector comprising a plurality of pins, wherein at least one of the plurality of pins has a length different from a remaining portion of the plurality of pins such that power between the main power bus and the payload module power bus is at least one of applied and removed, in a smooth and gradually ramped fashion over a time period, and wherein power and any concurrent data operations on the backplane remain uninterrupted and unaffected during the at least one of applying and removing power between the main power bus and the payload module power bus.

2. The multi-service platform system of claim 1, further comprising a power control module coupled to payload module, wherein the power control module is coupled to control application of power between the main power bus and the payload module power bus in a smooth and gradually ramped fashion over a time period when payload module power connector is coupled to the backplane.

3. The multi-service platform system of claim 1, further comprising a power control module coupled to payload module, wherein the power control module is coupled to control removal of power between the main power bus and the payload module power bus in a smooth and gradually ramped fashion over a time period when payload module power connector is decoupled from the backplane.

4. The multi-service platform system of claim 1, wherein the payload module power connector is coextensive with the at least one multi-gigabit connector on the rear edge of the payload module.

5. A multi-service platform system, comprising:
a backplane having a main power bus, wherein the backplane is coupled to operate a switched fabric coincident with at least one of a VMEbus network and a PCI network;
a switch module having one of a 3U form factor and a 9U form factor; wherein the switch module includes a central switching resource coupled to operate the switched fabric, wherein the switch module includes a switch module power bus that is adapted to be electrically coupled to the main power bus; and
a switch module power connector comprising a plurality of pins, wherein at least one of the plurality of pins has a length different from a remaining portion of the plurality of pins such that power between the main power bus and the switch module power bus is at least one of applied and removed, in a smooth and gradually ramped fashion over a time period, and wherein power and any concurrent data operations on the backplane remain uninterrupted and unaffected during the at least one of applying and removing power between the main power bus and the switch module power bus.

6. The multi-service platform system of claim 5, further comprising a power control module coupled to switch module, wherein the power control module is coupled to control application of power between the main power bus and the switch module power bus in a smooth and gradually ramped fashion over a time period when switch module power connector is coupled to the backplane.

7. The multi-service platform system of claim 5, further comprising a power control module coupled to switch module, wherein the power control module is coupled to control removal of power between the main power bus and the switch module power bus in a smooth and gradually ramped fashion over a time period when switch module power connector is decoupled from the backplane.

8. The multi-service platform system of claim 5, wherein the switch module is coupled to interface with the switched fabric and at least one of the VMEbus network and the PCI network.

9. A payload module, comprising:
a payload subunit coupled to the payload module, wherein the payload module has one of a 3U form factor, a 6U form factor and a 9U form factor;
at least one multi-gigabit connector coupled to a rear edge of the payload module and to the payload subunit, wherein the at least one multi-gigabit connector is coupled to communicatively interface the payload subunit to a backplane, wherein the backplane includes a switched fabric coincident with at least one of a VMEbus network and a PCI network, and wherein the switched fabric and at least one of the VMEbus network and the PCI network are communicatively coupled with the payload subunit through the at least one multi-gigabit connector; and
a payload module power connector comprising a plurality of pins, wherein at least one of the plurality of pins has a length different from a remaining portion of the plurality of pins such that power between a main power bus on the backplane and a payload module power bus on the payload module is at least one of applied and removed, in a smooth and gradually ramped fashion over a time period, and wherein power and any concurrent data operations on the backplane remain uninterrupted and unaffected during the at least one of applying and removing power between the main power bus and the payload module power bus.

10. The payload module of claim 9, further comprising a power control module coupled to payload module, wherein the power control module is coupled to control application of power between the main power bus and the payload module power bus in a smooth and gradually ramped fashion over a time period when payload module power connector is coupled to the backplane.

11. The payload module of claim 9, further comprising a power control module coupled to payload module, wherein the power control module is coupled to control removal of power between the main power bus and the payload module power bus in a smooth and gradually ramped fashion over a time period when payload module power connector is decoupled from the backplane.

12. The payload module of claim 9, wherein the payload module power connector is coextensive with the at least one multi-gigabit connector on the rear edge of the payload module.

13. A switch module, comprising:
a board having one of a 3U form factor and a 9U form factor;
a central switching resource coupled to the board, wherein the central switching resource is coupled to operate a switched fabric on a backplane, wherein the switched fabric operates coincident with at least one of a VMEbus network and a PCI network on the backplane; and
a switch module power connector comprising a plurality of pins, wherein at least one of the plurality of pins has a length different from a remaining portion of the plurality of pins such that power between a main power bus on the backplane and a switch module power bus on the switch module is at least one of applied and removed, in a smooth and gradually ramped fashion over a time period, and wherein power and any concurrent data operations on the backplane remain uninterrupted and unaffected during the at least one of applying and removing power between the main power bus and the switch module power bus.

14. The switch module of claim 13, further comprising a power control module coupled to switch module, wherein the power control module is coupled to control application of power between the main power bus and the switch module power bus in a smooth and gradually ramped fashion over a time period when switch module power connector is coupled to the backplane.

15. The switch module of claim 13, further comprising a power control module coupled to switch module, wherein the power control module is coupled to control removal of power between the main power bus and the switch module power bus in a smooth and gradually ramped fashion over a time period when switch module power connector is decoupled from the backplane.

16. The switch module of claim 13, wherein the switch module is coupled to interface with the switched fabric and at least one of the VMEbus network and the PCI network.

* * * * *